United States Patent [19]

Frejborg

[11] Patent Number: 4,880,540
[45] Date of Patent: Nov. 14, 1989

[54] PULP SCREENING APPARATUS

[75] Inventor: Frey Frejborg, Glens Falls, N.Y.

[73] Assignee: A. Ahlstrom Corporation, Noormarkku, Finland

[21] Appl. No.: 61,594

[22] Filed: Jun. 11, 1987

Related U.S. Application Data

[63] Continuation-in-part of Ser. No. 738,743, May 29, 1985, Pat. No. 4,676,903, which is a continuation-in-part of Ser. No. 472,742, Mar. 7, 1983, Pat. No. 4,529,520.

[30] Foreign Application Priority Data

Jan. 26, 1983 [FI] Finland ................................. 830256

[51] Int. Cl.⁴ .......................... B01D 29/38; B07B 1/20
[52] U.S. Cl. ...................................... 210/413; 209/273
[58] Field of Search .................. 162/55, 380; 209/273, 209/300, 305, 306, 379, 397; 210/413, 415, 498

[56] References Cited

U.S. PATENT DOCUMENTS

| 4,188,286 | 2/1980 | Holz ..................................... 209/273 |
| 4,529,520 | 7/1985 | Lampenius .......................... 210/498 |
| 4,676,903 | 6/1987 | Lampenius et al. ................ 209/273 |
| 4,776,957 | 10/1988 | Lampenius et al. ................ 209/273 |

Primary Examiner—Ivars Cintins
Attorney, Agent, or Firm—Bucknam and Archer

[57] ABSTRACT

The pulp screening apparatus comprises a housing having an inlet for allowing fibrous stock to be introduced into the interior, a first outlet for allowing the accept screened stock to be removed, a second outlet for the reject, a screen having a contour surface within the housing, a rotor moving in the vicinity of the screen at a predetermined speed and forming together with the screen an annular screening chamber. The rotor has at least the surface facing the screen partially contoured and is provided with a plurality of perforations along at least a portion of the length of the screening chamber to allow fibrous stock to be introduced into the screening chamber and to prevent the undesired debris of the stock from entering the chamber. Both sides of the rotor may have a contoured surface with grooves.

27 Claims, 8 Drawing Sheets

PULP SCREENING APPARATUS

The present application is a continuation-in-part of U.S. Ser. No. 738,743 filed on May 29, 1985 in the name of Harry Lampenius and Frey Frejborg, now U.S. Pat. No. 4,676,903. U.S. Ser. No. 738,743 is the continuation-in-part of U.S. Ser. No. 472,742, which has issued as U.S. Pat. No. 4,529,520. The subject matter of U.S. Ser. Nos. 472,742 and 738,743 is incorporated herein by reference.

The present application relates generally to apparatuses for screening fiber suspensions of consistency between 0.3% up to 6%, and in particular, to a screening apparatus for screening papermaking pulp containing wood portions and other undesirable particles of various sizes and types.

In U.S. Ser. No. 738,743, a pulp screening apparatus is described which comprises a vessel, a cylindrical screen within the vessel, a rotating element moving in the vicinity of the screen at a predetermined speed, an inlet for the unscreened pulp, an outlet for the accept screened pulp in the vessel, another outlet for the reject, in operative communication with the screen. The rotating element has a contour surface with grooves formed of a first bottom plane parallel to the envelope surface of the screen, an inclined plane and a side plane. The side plane is essentially perpendicular to the first bottom plane. The inclined plane forms an angle between 30°-60° with the first plane. The upper plane is parallel to the first plane. The screen is also provided with grooves.

In the paper making process, pulp is produced by cooking wood which separates the wood into fibers. Due to the different properties of the wood even from the same tree, some of the fibers do not separate and are dispersed as fiber bundles usually called debris, shives or slivers which form the reject. There are also other impurities, such as bark, which must be removed. The screen must separate the undesirable impurities and debris called the rejects from the accept portion. In order to avoid substantial loses of fibers which could be carried over together with the debris in the reject portion, it is necessary to remove the impurities efficiently and selectively.

It should be stressed that different applications have different requirements. In some applications, it is necessary to achieve a high content of long fibers, especially secondary fibers, in the accepts because the long fibers give strength to the final product, for instance paper. In other applications, on the other hand, the contrary is true. For instance, in virgin or pulp mill fibers, it is desirable to concentrate the long fibers in the reject for reject refining.

In some applications, it is preferable to operate the screen under smoother flow conditions while in other applications, it is advantageous to operate the screen under more turbulent conditions.

In pulp screening apparatus having a screen member and a rotor which form an annular screening zone, the stock enters at the inlet end of the screening zone and travels in an angle along the screening surface with the acceptable portions of the stock passing through the screening surface and with the rejectable portions of the pulp traveling along the screening surface essentially in a spiral path and passing out of the screening zone at the reject end. During the screening process, the liquid that accompanies the fibrous stock passes through the screening surface more easily than the fibers. Therefore, as the stock travels along the screening zone, it tends to increase in consistency which means that the fiber-to-water ratio is increased. If this ratio increases too much, the screening process will be slowed down or will be even interrupted. In order to prevent this slow-down or interruption, it has been common practice to add more water to the stock to replace some of the water which has passed through the screening surface so as to maintain a satisfactory screening consistency on the inlet side.

Another method used to maintain the screening consistency on the inlet side is to intentionally feed the apparatus with over-diluted stock so that the excess water at the inlet will be sufficient to allow for continuity of screening throughout the screening zone. However, both methods of adding more water during the screening or initially over-diluting the stock have undesirable effects such as diminishing the capacity of the screen by the amount of water added.

Many proposals have been made to solve the problems discussed hereinabove. In Swedish Pat. No. 37 4148 to S. E. E. Ahlfors published in 1975 the apparatus comprises a pressure screen having a coarse screening drum and a fine screening drum, the former surrounding the latter and provided with pulse generating means and perforations on the back side of or immediately behind the pulse generating means. This apparatus has the drawback that it cannot be readily used in an existing housing as a retrofit and would be very expensive since two motors are required to rotate the two drums, one independently from the other.

In Finnish Pat. No. 66218 to Sunds Defibrator Aktiebolag, published in 1979, a screen apparatus is described in which a rotating coarse screening drum and a fine screening drum, are provided. The former is provided with pumping means to remove by suction, impurities which have plugged the openings of the fine screening drum. This proposal which involves coarse screening and fine screening has met only with partial success because of high manufacturing cost and low general performance. Further, due to the size and operational conditions of the pumping pipes, this apparatus cannot be readily used in a conventional housing as a retrofit.

The apparatus of Finnish Pat. No. 66218 is also described in Tappi Journal, September, 1986, page 27, and in Tappi Proceedings, (1986) Engineering Conference, pp. 585–587.

Pulps of different consistencies require screens with different contours. Different contours are also required with pulp suspensions having different physical properties and for different applications.

An object of the present invention is to separate the long fibers from slives and debris efficiently and selectively.

Another object is to provide a screening apparatus which may be operated under smooth flow as well as under more turbulent flow conditions.

Still another object is to maintain the desired screening efficiency without adding water during the screening operation and without using initially an overly diluted stock.

A further object is to provide a screening apparatus which can operate at pulp feed consistencies between 0.3% up to 6%.

Still another object is to provide a rotor which may be used with a variety of contoured screens, for a variety of pulp suspensions, which may provide the pumping effect required with the low consistency suspensions and which may provide the turbulence required for higher consistency stocks.

To achieve the above objects, the screening apparatus according to the invention comprises a housing having an inlet for allowing fibrous stock to be introduced into the interior of the housing, an outlet for allowing the accepted screened stock to be removed from the housing, an outlet for the reject, a contoured screen within the housing, a rotor moving in the vicinity of the screen at a predetermined speed and forming together with the screen an annular screening chamber, the rotor having at least one partially contoured surface on the side facing screen and provided with a plurality of perforations along at least a portion of the length of the screening chamber to allow fibrous stock to be introduced into the screening chamber and to prevent the undesired debris of the stock from entering the chamber.

Other objects and features of the present invention will be apparent from the following description taken in conjunction with the appended drawings, of which.

Figure 9:
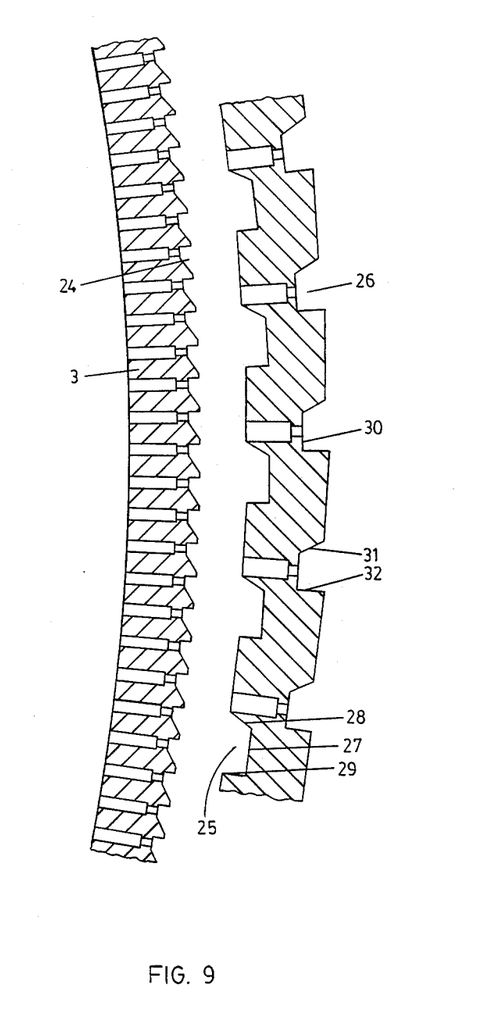
FIGS. 9, 9a and 9b illustrate an apparatus intended for inflow configuration.
Figures 9A, 9B:
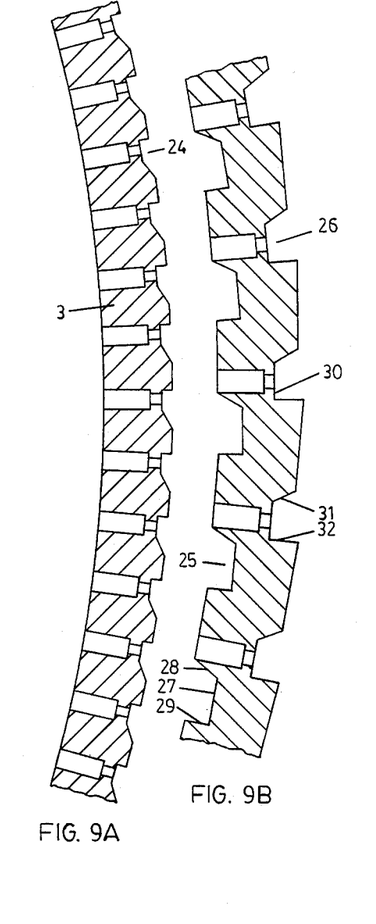

In the embodiment of FIG. 9, the pulp flows from the outside to the inside of the screen and the contoured surface of the screen is on the outside of the screen.

Figure 1:
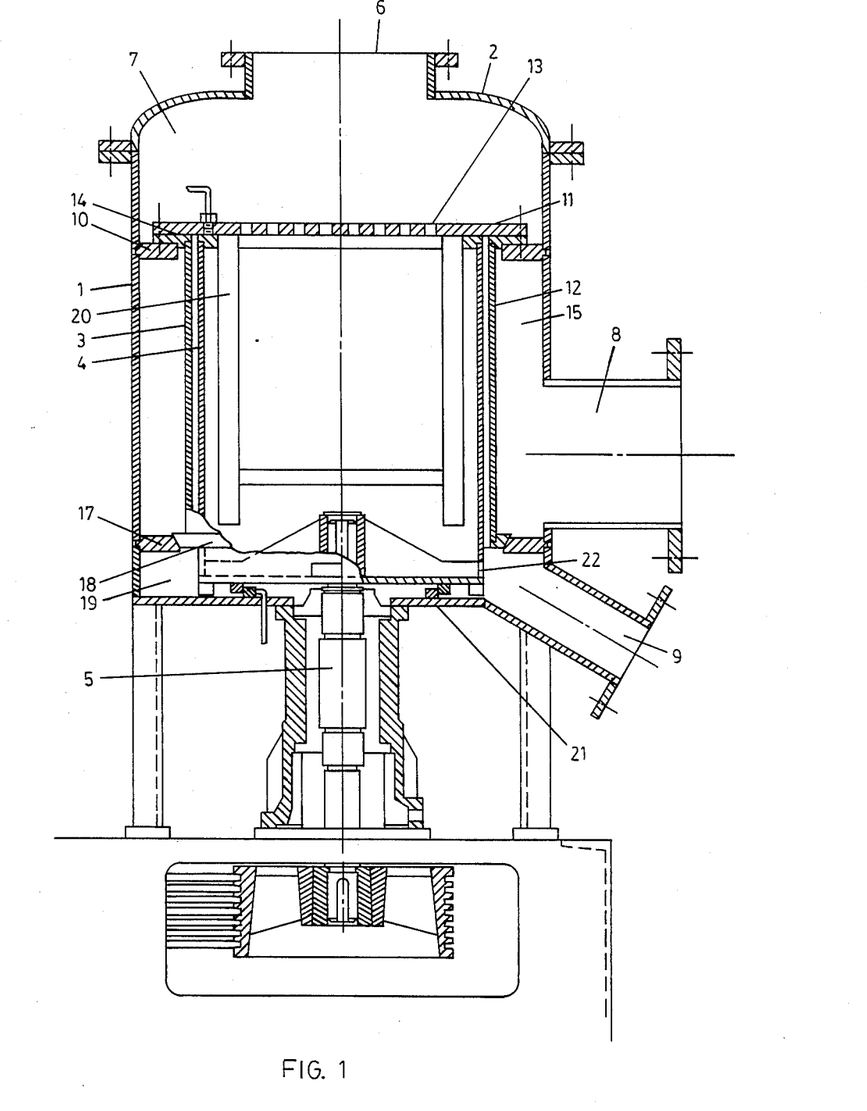
FIG. 1 is a side elevation view, partly broken away, of a screening apparatus according to the invention.
Figure 2:
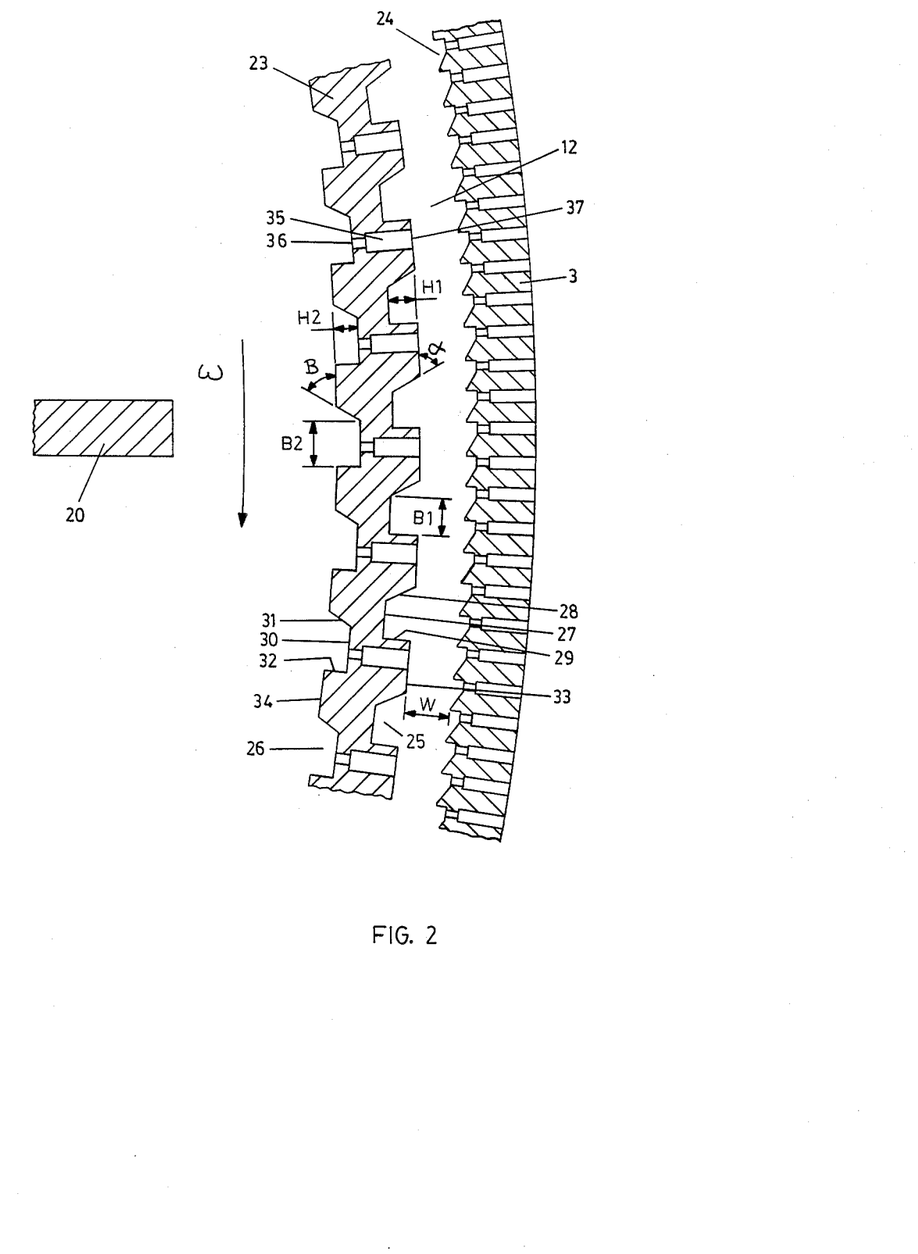
FIGS. 2, 2a and 2b illustrate the embodiment of the screening apparatus according to the present invention and specifically with the rotor being located on the inlet side of the screen. The rotor is always disposed on the inlet side of the screen but the apparatus may be operated in an outflow or inflow manner. In the outflow manner of FIG. 2 the pulp flows from the inside to the outside of the screen and the contoured surface of the screen is on the inside of the screen.
Figures 2A, 2B:
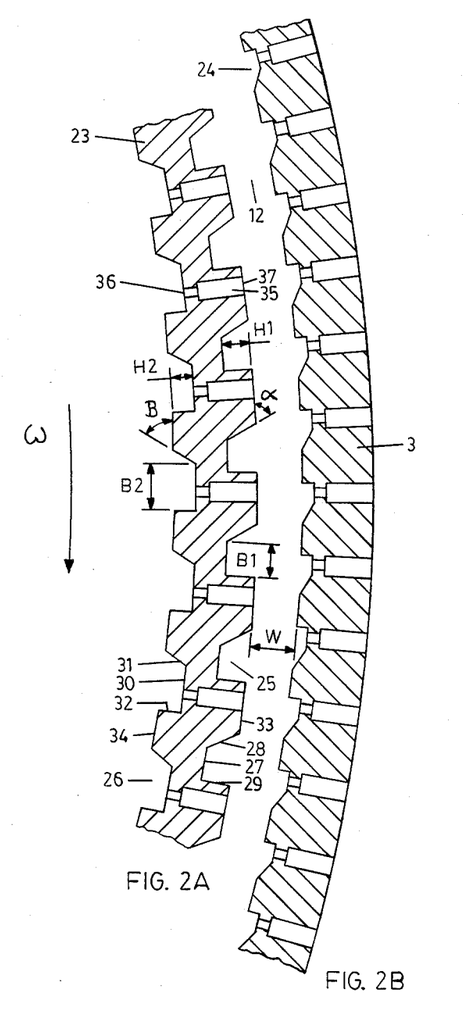

As illustrated in FIGS. 1 and 2 the screening apparatus includes a pressurized housing 1, a cylindrical screen 3 positioned within the housing, a rotor 4 mounted within the screen on the upper part of a rotatable, vertical shaft 5. The housing has an inlet 6 for allowing unscreened pulp suspension to be introduced into a chamber 7 in the upper part of the housing, an outlet 8 for accepted (screened) stock, a reject chamber 19 and an outlet 9 for rejected stock in the lower end. A screening chamber 12 is formed between the cylindrical screen and the rotor. Numeral 15 designates the accept chamber.

Numeral 2 designates a removable cover for the housing and numeral 11 designates a plate closing the upper end of the screening chamber. A flange 14 in the upper end of the cylindrical screen by means of which the screen member is fixed to the structure 10 and the structure 10 form a partition between the first chamber 7 in the upper part of the housing which is the infeed chamber and a second chamber 15 which is the accept chamber. The latter is formed between the vertical walls 16 of the housing and the cylindrical screen which second chamber surrounds the cylindrical screen. The housing includes an additional structure 17 which, together with a flange 18, forms a partition between the second chamber and a third chamber 19 which is the reject chamber in the bottom part of the housing. The stock inlet 6 communicates directly with the first chamber, the accept outlet 8 communicates directly with the second chamber and the reject outlet 9 communicates directly with the third chamber.

Essentially, axial bars or foils 20 which extend along at least a portion of the length of the rotor are mounted on a support adjacent the inner surface of the rotor. A plate 21 closes the lower end of the rotor. Openings 22 in the lower end of the rotor drum 23 provide communication between the space inside the rotor and the reject chamber.

The screen plate 3 has a countoured surface. According to one embodiment, shown in FIG. 2, the cylindrical screen plate has grooves 24 in the inlet surface. Also the outside and the inside surfaces of the rotor are contoured with grooves 25 and 26, but the rotor could have only one contour surface facing the screen. The contour surface is not necessarily continuous.

The grooves 25 on the screen side of the rotor are formed of a bottom plane 27 and two side planes 28 and 29. The grooves 26 on the inlet side of the rotor are likewise formed by a bottom plane 30 and two side planes 31 and 32.

The bottom planes 27 and 30 are generally perpendicular to the side planes 32 and 29. The side planes 28 and 31 are generally inclined with respect to the cylindrical outer and inner surfaces. The angle $\alpha$ is formed between upper plane 33 and the inclined plane 28 and is in this embodiment between 5° and 60°. The angle $\beta$ is formed between the envelope surface 34 and side plane 31 and is between 10° and 60°.

The symbol $H_1$ designates the distance between the bottom plane 27 and the upper plane 33 in the outer surface of the rotor and may be between 1/16 inch and 2 inches. The symbol $H_2$ designates the distance between the bottom plane 30 and the envelope surface 34 in the inlet side of the rotor and may be between 1/16 inch and 2 inches. The symbols $B_1$ and $B_2$ designate the width of the bottom planes 27 and 30 in the outer and inner surface respectively of the rotor and may be as low as ⅛ inch and as long as 2 inches.

The rotor 23 has a plurality of perforations 35 extending along a portion (L in FIG. 1) of its axial length beginning from its upper end and a size allowing fibrous stock to pass through the rotor but preventing foreign objects of larger size than the inlet openings 36 of the perforations from entering the screening zone 12. The inlet openings of the perforations are positioned in the bottom plane of the grooves 26 on the inlet side of the rotor and the discharge openings 37 are positioned either on the upper plane 33 of the outlet surface of the rotor or on the inclined plane 28 or on the bottom plane 27.

The perforations in the rotor are either cylindrical or preferably slotted in section. The discharge opening of the perforations is preferably larger than the inlet opening.

The grooves as well as the perforations of the rotor are larger than the grooves and the perforations of the screen in the embodiment of FIG. 2 but this is not essential. The rotor may also be constructed of contoured bars which, when assembled, form longitudinal openings therebetween which then constitute the perforations of the rotor. The contoured bars may be represented by the dotted lines drawn through the openings of the rotor as shown in FIG. 2.

The inclined side plane on each surface of the rotor can be the leading side plane or the trailing plane of the groove in relation to the direction of the rotation of the rotor in the embodiment of FIG. 2.

The rotor may rotate in different directions, that is, clockwise as shown in FIG. 2, for high efficiency, or counterclockwise to achieve high capacity.

The grooves 25 and 26 may be located in relation to each other as shown in FIG. 2, that is the inclined planes being the downflow sides of the grooves. However, either or both of the grooves 25 and 26 may be formed so that the perpendicular planes 29, 32 are the downflow sides of the grooves. It is also possible that the grooves are so formed that every second groove has as its downflow side the inclined plane and the others have the perpendicular plane. Also it is possible to arrange the grooves in groups so that a certain group of grooves has as its downflow side the inclined planes and the next group of grooves the perpendicular planes.

In the outflow operation shown in FIGS. 1 and 2, pulp suspension is supplied to the first chamber 7 in the upper end of the apparatus through inlet 6 and flows into the rotor 4. The fibrous stock flows through the perforations in the rotor to the screening chamber and particles larger than the perforations will not pass through the perforations of the rotor. The large cross-sectional area of the rotor allows heavy foreign material to settle for rejection through the openings 22 at the lower end of the rotor and allows the pulp suspension to flow in an almost radial direction towards the inner surface of the rotor. Due to the interaction between the rotating grooved surface of the rotor and the pulp suspension which is prevented from rotating by the essentially axial flow interruptors 20, high-intensity pulses and turbulence are generated which prevent a mat of fibers from forming at the openings in the grooves 26. By adjusting the position and the inclination of the flow interruptors in relation to the grooved surface, the intensity of the pulses and the turbulence can be varied. If required, dilution water could be directed through the flow interruptors toward the grooved surface in the lower part of the rotor.

The stock which enters the screening chamber is set into circumferential motion by the rotor and subjected to high-intensity pulses and turbulence when flowing over essentially in a direction perpendicular to the grooves on the screen surface. The angle between the direction of the grooves and the axial direction of the cylinder of the screen plate may be from 0° to 45°. The acceptable fibers pass through the perforations in the screen to be collected in the chamber 15 surrounding the screen and are removed through the outlet 8 as accepted stock. Any stock not passing through the perforations of the rotor or the screen is collected in the chamber 19 in the lower end of the housing and is discharged through the outlet 9 as rejects.

Figure 5:
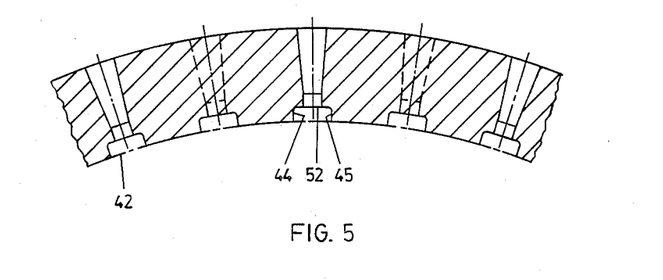

In the embodiment illustrated in FIG. 5, the grooves 52 are U-shaped, and both side planes 44 and 45 are substantially perpendicular to the envelope surface 42 of the screen surface.

Figure 6:
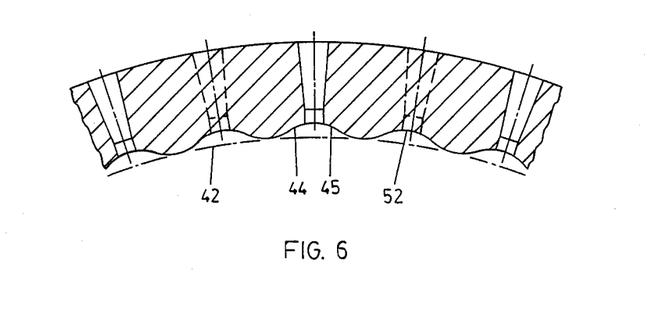

In the embodiment of FIG. 6, the screen surface is undulant and both sides 44 and 45 of the grooves 52 are inclined with regard to the envelope surface 42 of the screen surface.

The surface of the rotor which does not face the screen is not necessarily grooved and it is not necessary that the entire surface of the rotor be grooved.

The inlet side of the rotor also may have a contour surface, for instance, the contour of the screen as shown in FIGS. 3-8.

EXAMPLE I

This example describes a typical screening apparatus with a cylindrical rotor having an outer diameter of 20 inches and a thickness of ⅜ inch.

Depth ($H_1$ and $H_2$) of grooves of the rotor: ⅛ inch
Width ($B_1$ and $B_2$) of bottom plane: 3/16 inch
Angle ($\alpha$ and $\beta$) 50°
Width of axial slots 36: 1/16 inch
Circumferential spacing of grooves, that is the distance between consecutive grooves 26: 0.5 inch
Width (W) of the screening chamber: 3/16 inch The screening chamber 12 between the rotor and the screen can be as narrow as 1 mm and as large as 50 mm.

When the screening chamber is narrow, between 1 and 3 mm, an effective hydrodynamic interaction between the grooved surfaces of the rotor and the screen facing each other is achieved, and advantageous conditions for the screening are provided. This also permits the screen to efficiently handle stock of high consistency, up to 6%.

Figure 3:
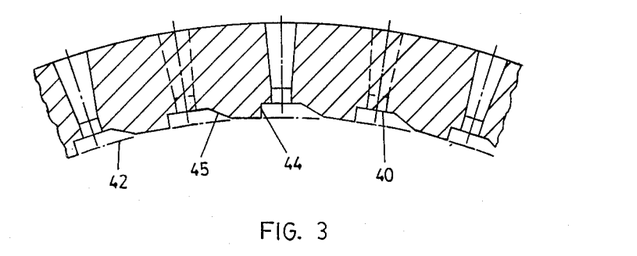
FIGS. 3, 4, 5, 6, 7a, 7b and 8 illustrate screenplates which may be used together with the rotor according to the present invention.
Figure 4:
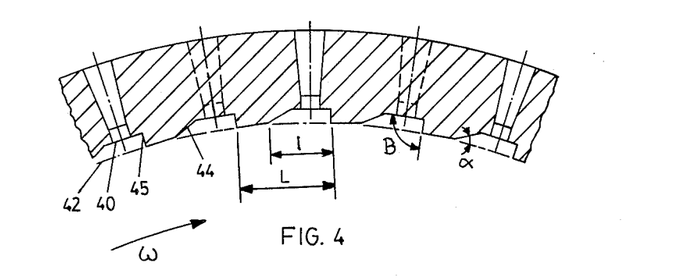

In the embodiments of FIGS. 3 and 4, the groove in the screen is formed of a bottom plane 40 which is substantially parallel with the envelope surface 42 of the screen surface, an upstream side plane 44 as seen standing from the bottom of the groove and a downstream side plane 45. In FIG. 3, the angle $\alpha$ between the envelope surface of the screen surface and the upstream side plane 44, or in other words between the plane tangenting the envelope surface of the screen surface close to this side plane and this side plane is approximately 90° and the angle $\beta$ between the envelope surface of the screen surface and the downstream side plane 45 is 5°-60°. In FIG. 4 the angle is $\alpha$ 5°-60° and the angle $\beta$ is 90°. The perforations of the screen plate are disposed on the bottom planes 40 of the grooves.

Figure 7A:
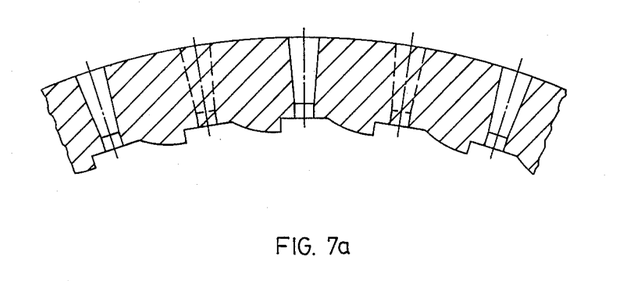
Figure 7B:
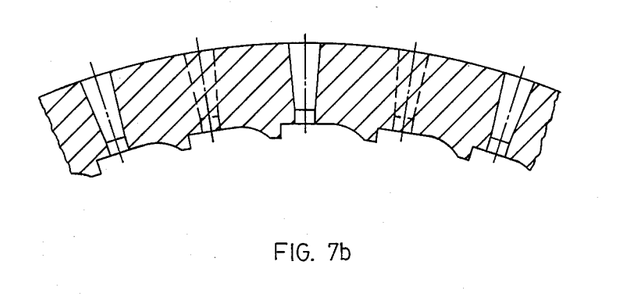

In the embodiment of FIG. 7, in the screen, the grooves have two side planes, a bottom plane and an upper plane, one side plane is perpendicular to the envelope surface of the screen and the other side plane is curved, convex or concave with respect to the envelope surface.

Figure 8:
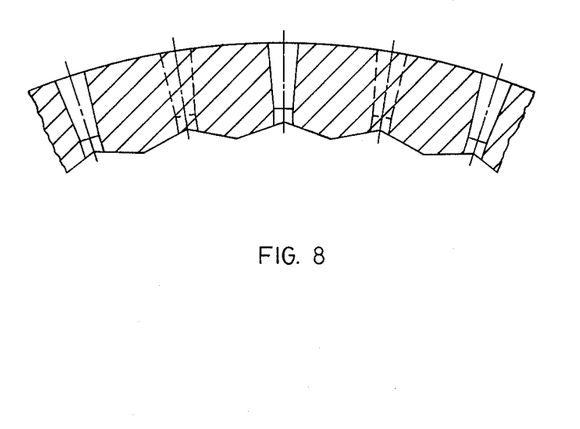

In FIG. 8 the sides of the grooves have an inverted V-shape configuration.

Although FIGS. 1 and 2 show an apparatus intended for outflow operation, the apparatus according to FIG. 9 may be readily adapted for inflow configuration according to which the pulp is fed into the outer surface of the rotor, goes through the perforations inwardly, flows into the screening chamber. Thereafter the accept portion passes through the finer perforations of the screen into the accept chamber and the remaining reject portion in the screening chamber moves towards the reject chamber. This operation is particularly advantageous when large dirt type particles are to be removed.

Another advantage of the apparatus according to the present invention is that it may be retrofitted and used with conventional screen housings, resulting in major capital savings.

What is claimed is:

1. A pulp screening apparatus comprising a housing having an inlet for allowing fibrous stock to be introduced into the interior thereof, a first outlet for allowing the accept screened stock to be removed therefrom, a second outlet for the reject, a screen cylinder having a contour surface with grooves within said housing, a rotor moving in the vicinity of said screen at a predetermined speed and forming together with said screen an annular screening chamber, said rotor being located in the inlet side of the screen and wherein at least the surface facing the screen is at least partially contoured with grooves and is provided with a plurality of openings or perforations along at least a portion of the length of said screening chamber to allow fibrous stock to be introduced into said screening chamber and prevent the undesired debris of the stock from entering said chamber.

2. The apparatus according to claim 1, wherein the rotor has an inlet side surface and an outlet side surface and both surfaces of said rotor are grooved.

3. The apparatus according to claim 2 wherein, the opening of the perforations of the rotor have an inlet and the inlet of the perforations is disposed in the bottom part of the grooves of the rotor inlet side.

4. The apparatus according to claim 2 wherein the contoured surface of the screen consists of grooves with perforations, said perforations being holes or slots, the grooves and the perforations of the rotor are larger than the grooves and perforations of the screen.

5. The apparatus according to claim 4 wherein the screen has an envelope surface and is a cylindrical screenplate having grooves with perforations, the perforations are at the bottom of the grooves, the bottom plane of the grooves is parallel to the envelope surface, the grooves have two side planes, one side plane of the grooves is substantially perpendicular to the envelope surface of the screen surface and the other side plane is inclined with regard to said envelope surface.

6. The apparatus according to claim 5 wherein said screen plate has grooves in the side of the inlet recessed in the screen surface, the screen plate having an envelope surface, the grooves being formed of an upstream side plane, as seen standing from the bottom of the grooves, a downstream side plane and a bottom plane, said bottom plane being substantially parallel to the envelope surface of the screen plate, the grooves having perforations in the bottom plane, the upstream side plane of the grooves being substantially perpendicular to said envelope surface and the downstream side place of the grooves forming a 60° −5° angle against said envelope surface.

7. The apparatus according to claim 6 wherein in said screen plate the downstream side plane and the upstream side plane of the grooves are connected to each other by means of a plane substantially parallel to said envelope surface.

8. The apparatus according to claim 5 wherein the downstream side plane of the grooves of the screen is substantially perpendicular to the envelope surface of the screen surface and the upstream side plane is inclined.

9. The apparatus according to claim 1, wherein said grooves of the rotor have a bottom plane and two side planes, of which one is inclined and the other is perpendicular to the bottom plane, said inclined plane forming an angle with the bottom plane between 5° and 60°.

10. The apparatus according to claim 9, wherein the grooves of the rotor have an upstream side and a downstream side, the downstream side of the grooves of the rotor is inclined against the surface of the rotor and the upstream side is essentially perpendicular to the surface of the rotor.

11. The apparatus according to claim 9 wherein the grooves of the rotor have an upstream side and a downstream side, the downstream side plane of the grooves of the rotor is essentially perpendicular to the bottom plane and the upstream side is inclined against the surface of the rotor.

12. The apparatus according to claim 9 wherein the perforations have an outlet and the outlet is disposed in the inclined plane of the grooves of the rotor outlet side.

13. The apparatus according to claim 9 wherein the perforations have an outlet disposed in the upper plane of the grooves of the rotor outlet side.

14. The apparatus according to claim 9 wherein the perforations have an outlet disposed in the bottom plane of the grooves of the rotor outlet side.

15. The apparatus according to claim 3 wherein said grooves also have an upper plane.

16. The apparatus according to claim 1 wherein the rotor inner surface faces the outer contour surface of the screen.

17. The apparatus according to claim 16 wherein said screen has an inlet side and an outlet side, and the contoured surface of the screen is on the outside of the screen.

18. The apparatus according to claim 1 wherein said rotor is cylindrical.

19. The apparatus according to claim 1 wherein said rotor is non-cylindrical.

20. The apparatus according to claim 1 wherein the perforations in the rotor are cylindrical.

21. The apparatus according to claim 1 wherein the perforations in the rotor are non-cylindrical.

22. The apparatus according to claim 1 wherein said screen has an inlet side and an outlet side, the contoured surface of the screen is on the inside of the screen.

23. The apparatus according to claim 1 wherein the contoured surface of the screen consists of grooves and both side planes of the grooves are substantially perpendicular to the envelope surface of the screen.

24. The apparatus according to claim 1 wherein the screen has an envelope surface is a cylindrical screenplate having grooves, the perforations are at the bottom of the grooves, the bottom plane of the grooves is parallel to the envelope surface, the grooves have two side planes and an upper plane, one side plane of the grooves is substantially perpendicular to the envelope surface of the screen and the other side plane is curved with regard to said envelope surface.

25. The apparatus according to claim 24 wherein said side plane is convex or concave with respect to said envelope surface.

26. The apparatus according to claim 1 wherein the screen has an envelope surface and the surface is undulant, the screen has grooves and both sides of the grooves are inclined with respect to the envelope surface.

27. A pulp screening apparatus comprising a housing having an inlet for allowing fibrous stock to be introduced into the interior thereof, a first outlet for allowing the accept screened stock to be removed therefrom, a second outlet for the reject, a screen cylinder having a contour surface with grooves within said housing, a rotor moving in the vicinity of said screen at a predetermined speed and forming together with said screen an annular screening chamber, said rotor being located in the inlet side of the screen and wherein at least the surface facing the screen is at least partially contoured with spaced contoured bars and is provided with as plurality of openings or perforations along at least a portion of the length of said screening chamber to allow fibrous stock to be introduced into said screening chamber and prevent the undesired debris of the stock from entering said chamber.

* * * * *